(12) United States Patent
Lautenschlager et al.

(10) Patent No.: US 7,153,912 B2
(45) Date of Patent: Dec. 26, 2006

(54) USE OF SILOXANE COPOLYMERS COMPRISING ALKENYL GROUPS AS ANTIMISTING ADDITIVES IN CROSS-LINKABLE SILICONE COATING COMPOSITIONS

(75) Inventors: Hans Lautenschlager, Haiming (DE); Christian Herzig, Feichten-Waging (DE)

(73) Assignee: Wacker Chemie AG, Munich (DE)

( * ) Notice: Subject to any disclaimer, the term of this patent is extended or adjusted under 35 U.S.C. 154(b) by 292 days.

(21) Appl. No.: 10/506,657

(22) PCT Filed: Feb. 20, 2003

(86) PCT No.: PCT/EP03/01760

§ 371 (c)(1),
(2), (4) Date: Sep. 3, 2004

(87) PCT Pub. No.: WO03/074590

PCT Pub. Date: Sep. 12, 2003

(65) Prior Publication Data

US 2005/0208311 A1    Sep. 22, 2005

(30) Foreign Application Priority Data

Mar. 7, 2002 (DE) ................. 102 10 015

(51) Int. Cl.
*C08L 83/04* (2006.01)
(52) U.S. Cl. ............ 525/477; 525/478; 528/15; 528/25; 528/31; 528/32
(58) Field of Classification Search ........ None
See application file for complete search history.

(56) References Cited

U.S. PATENT DOCUMENTS

| 5,241,034 A | * | 8/1993 | Herzig et al. ........... 528/15 |
| 5,386,007 A | * | 1/1995 | Herzig et al. ........... 528/12 |
| 5,691,435 A |   | 11/1997 | Herzig et al. |
| 5,760,145 A |   | 6/1998 | Herzig et al. |
| 6,034,225 A |   | 3/2000 | Weidner et al. |
| 6,258,913 B1 |  | 7/2001 | Herzig et al. |
| 6,265,497 B1 |  | 7/2001 | Herzig |
| 6,274,692 B1 |  | 8/2001 | Herzig et al. |
| 6,451,909 B1 | * | 9/2002 | Herzig et al. ........... 524/837 |
| 6,759,094 B1 | * | 7/2004 | Herzig et al. ........... 427/387 |

FOREIGN PATENT DOCUMENTS

| DE | 41 23 423 A1 | 1/1993 |
| DE | 195 22 144 A1 | 1/1997 |
| DE | 196 29 053 A1 | 1/1998 |
| EP | 0 523 660 B1 | 7/1991 |
| EP | 0 439 777 B1 | 8/1991 |
| EP | 0 439 778 A2 | 8/1991 |
| EP | 0 607 869 B1 | 7/1994 |
| EP | 0 716 115 A2 | 6/1996 |
| EP | 1 277 786 A1 | 1/2003 |
| WO | WO 01/98420 A2 | 12/2001 |

OTHER PUBLICATIONS

Derwent Abstract Corresponding to DE 195 22 144 A1.
Derwent Abstract Corresponding to DE 196 29 053 A.
Derwent Abstract Corresponding to DE 412 23 423 A1.

* cited by examiner

*Primary Examiner*—Marc S. Zimmer
(74) *Attorney, Agent, or Firm*—Brooks Kushman P.C.

(57) ABSTRACT

Branched, alkenyl-functional organopolysiloxanes prepared by reacting an organic compound having at least two aliphatic double bonds with an organopolysiloxane having more than one Si-bonded hydrogen atom, in the presence of a hydrosilylation catalyst, and in a stoichiometric ratio of aliphatic double bonds to Si-bonded hydrogen such that an alkenyl-functional product is obtained, function as highly effective antimisting additives in the high speed coating of substrates with crosslinkable silicone compositions.

16 Claims, No Drawings

USE OF SILOXANE COPOLYMERS COMPRISING ALKENYL GROUPS AS ANTIMISTING ADDITIVES IN CROSS-LINKABLE SILICONE COATING COMPOSITIONS

BACKGROUND OF THE INVENTION

1. Field of the Invention

The invention relates to the use of antimisting additives for reducing the formation of aerosol in crosslinkable silicone coating compositions.

2. Description of the Related Art

A trend within the silicone coating industry is to increase machine speed in order to raise productivity. Where silicone coatings are applied to the substrate at relatively high speeds, of more than 300 m/min, for example, fine spray mists of the silicone coating system may be formed. This aerosol is formed at the silicone applicator unit. The formation of this spray mist proves to be a serious problem in the context of further increases in the coating speed.

The formation of this spray mist can be reduced by adding what are known as antimisting additives to the silicone coating system.

EP-A 716 115 (Dow Corning Corp.) describes antimisting additives obtained by reacting an organosilicon compound, a compound containing oxyalkylene groups, and a catalyst. The addition of these oxyalkylene-functional reaction products to crosslinkable silicone coating systems reduces the formation of aerosol in rapid coating processes.

WO 01/98420 (Dow Corning Corp.) discloses a liquid silicone antimisting composition, which is obtained by reacting a) an organohydropolysiloxane having at least two Si—H groups (SiH) with
b) an organoalkenylsiloxane having at least three alkenyl groups (C=C) in
c) the presence of a platinum catalyst and if desired
d) an inhibitor in a ratio of C=C/SiH≧4.6.

An extremely large excess of organoalkenylsiloxane (C=C) is necessary in order to prevent gelling. This excess influences the release properties of the base system, the crosslinkable silicone coating composition. Furthermore, an inhibitor has to be added to prevent gelling.

U.S. Pat. No. 5,241,034 (Wacker-Chemie GmbH) describes alkenyl functional siloxane copolymers which are branched and whose organopolysiloxane blocks are linked by hydrocarbon bridges.

SUMMARY OF THE INVENTION

An object of the present invention was to provide antimisting additives for silicone coating compositions which reduce the formation of aerosol in rapid coating processes, which are readily miscible with the silicone coating compositions, and which do not impair the silicone coating compositions. These and other objects are achieved by the invention.

DETAILED DESCRIPTION OF THE PREFERRED EMBODIMENTS

The invention provides for the use of antimisting additives in crosslinkable silicone coating compositions for reducing the formation of aerosol, characterized in that as antimisting additives alkenyl-functional siloxane copolymers containing (a) siloxane units of the formula

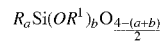
$$R_a Si(OR^1)_b O_{\frac{4-(a+b)}{2}} \qquad (I)$$

where R identical or different, unhalogenated or halogenated hydrocarbon radicals having from 1 to 18 carbon atoms per radical, $R^1$ are identical or different alkyl radicals having from 1 to 4 carbon atoms per radical, which may be substituted by an ether oxygen atom, a is 0, 1, 2 or 3, b is 0, 1, 2 or 3 and the sum a+b is not greater than 3, (b) per molecule at least one siloxane unit of the formula

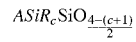
$$ASiR_c SiO_{\frac{4-(c+1)}{2}} \qquad (II)$$

where R is as defined above, c is 0, 1 or 2,

A is a radical of the formula

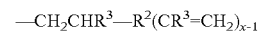
$$-CH_2CHR^3-R^2(CR^3=CH_2)_{x-1}$$

where $R^2$ is a divalent, trivalent or tetravalent hydrocarbon radical having from 1 to 25 carbon atoms per radical, $R^3$ is a hydrogen atom or an alkyl radical having from 1 to 6 carbon atoms per radical, and x is 2, 3 or 4, and (c) per molecule on average at least one unit selected from the group consisting of units of the formulae where R and c are as defined above,

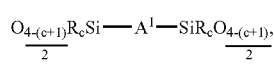
(III)

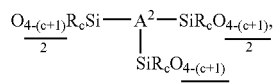
(IV)

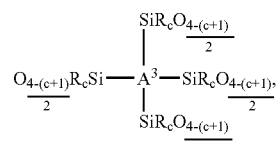
(V)

$A^1$ is a radical of the formula

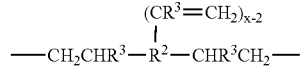
$$-CH_2CHR^3-R^2-CHR^3CH_2-$$

where $R^2$, $R^3$ and x are as defined above, $A^2$ is a radical of the formula

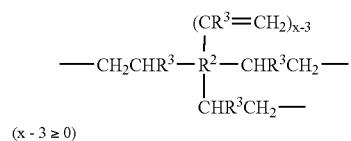

(x - 3 ≥ 0)

where $R^2$, $R^3$ and x are as defined above, with the proviso that $R^2$ is not a divalent hydrocarbon radical, and
$A^3$ is a radical of the formula

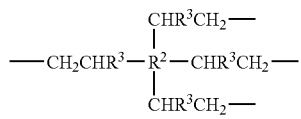

where $R^2$ and $R^3$ are as defined above, with the proviso that $R^2$ is not a divalent or trivalent hydrocarbon radical.

Preferred alkenyl-functional siloxane copolymers are those containing
(a) siloxane units of the formula $$R_2SiO \qquad (I'),$$

(b) per molecule on average more than one siloxane unit of the formula $$AR_2SiO_{1/2} \qquad (II') \text{ and}$$

(c) per molecule on average at least one unit selected from the group consisting of units of the formulae $$O_{1/2}R_2Si\text{—}A^1\text{—}SiR_2O_{1/2} \quad \text{and} \qquad (III')$$

 (IV')

where R, A, $A^1$ and $A^2$ are as defined above.

With particular preference the alkenyl-functional siloxane copolymers contain per molecule on average at least two siloxane units of the formula (II').

The invention also provides for the use of antimisting additives in crosslinkable silicone coating compositions for reducing the formation of aerosol, which comprises using as antimisting additives alkenyl-functional siloxane copolymers preparable.

by reacting organic compound (1) containing at least two aliphatic double bonds, of the general formula $$R^2(CR^3\text{=}CH_2)_x,$$

where $R^2$ is a divalent, trivalent or tetravalent hydrocarbon radical having from 1 to 25 carbon atoms per radical,
$R^3$ is a hydrogen atom or an alkyl radical having from 1 to 6 carbon atoms per radical, and
x is 2, 3 or 4
with organopolysiloxane (2) having on average more than one Si-bonded hydrogen atom per molecule
in the presence of catalyst (3) which promotes the addition of Si-bonded hydrogen onto aliphatic double bond,
the ratio of aliphatic double bond in organic compound (1) to Si-bonded hydrogen in the organopolysiloxane (2)

being such that alkenyl-functional siloxane copolymers having on average more than one alkenyl group per molecule, of the formula $$\text{—}CR^3\text{=}CH_2,$$

where R3 is as defined above, are obtained.

In the process according to the invention, alkenyl-functional siloxane copolymers having on average at least four alkenyl groups per molecule, of the formula $$\text{—}CR^3\text{=}CH_2,$$

preferably on average at least eight alkenyl groups per molecule, of the formula $$\text{—}CR^3\text{=}CH_2,$$

where $R^3$ is as defined above,
are preferably obtained.

The alkenyl-functional siloxane copolymers and their preparation are described in the above-cited U.S. Pat. No. 5,241,034, and U.S. Pat. No. 5,241,034 (incorporated by reference) is therefore part of the disclosure content of this specification.

The antimisting additives of the invention, the alkenyl-functional siloxane copolymers, have the advantage that they not only reduce the formation of aerosol by crosslinkable silicone coating compositions in rapid coating systems but also, in particular, can be mixed in any desired proportions, homogeneously, with the crosslinkable silicone coating compositions, unlike the antimisting additives containing polyglycol groups from the above-cited EP-A 716 115.

Moreover, the antimisting additives of the invention have no inhibiting effect and they are storage-stable. The antimisting additives according to the invention have the advantage that they can be mixed beforehand with the polymer component (A) of the crosslinkable silicone coating composition. They are consequently easy to handle and do not impair the release properties of the base system, the crosslinkable silicone coating composition.

The alkenyl-functional siloxane copolymers of the invention preferably possess a viscosity of from 500 to 5,000,000 mPa·s at 25° C., more preferably from 1000 to 1,000,000 mPa·s at 25° C.

In the alkenyl-functional siloxane copolymers according to the invention the siloxane blocks are joined to one another via hydrocarbon groups, resulting in a hydrocarbon-siloxane block structure. Preferably the sum of the hydrocarbon groups A, $A^1$, $A^2$ and $A^3$ in the alkenyl-functional siloxane copolymers is from 0.1 to 10% by weight, more preferably from 0.1 to 2% by weight, based in each case on the total weight of the alkenyl-functional siloxane copolymers.

The polyaddition process of the invention results automatically in a polymer distribution in respect of the siloxane blocks and of the hydrocarbon blocks. A "polyadduct" of this kind usually also contains lower oligomers, which also include adducts consisting only of one siloxane block and two hydrocarbon blocks.

Examples of radicals R are alkyl radicals, such as the methyl, ethyl, n-propyl, isopropyl, 1-n-butyl, 2-n-butyl, isobutyl, tert-butyl, n-pentyl, isopentyl, neopentyl, tert-pentyl radical; hexyl radicals, such as the n-hexyl radical; heptyl radicals, such as the n-heptyl radical; octyl radicals, such as the n-octyl radical and isooctyl radicals, such as the 2,2,4-trimethylpentyl radical; nonyl radicals, such as the n-nonyl radical, decyl radicals, such as the n-decyl radical; dodecyl radicals, such as the n-dodecyl radical; octadecyl radicals, such as the n-octadecyl radical; cycloalkyl radicals, such as cyclopentyl, cyclohexyl, cycloheptyl radicals and methylcyclohexyl radicals; aryl radicals, such as the phenyl, naphthyl, anthryl and phenanthryl radical; alkaryl radicals, such as o-, m-, p-tolyl radicals, xylyl radicals and ethylphenyl radicals and aralkyl radicals, such as the benzyl radical, the α- and the β-phenylethyl radical. The methyl radical is preferred.

Examples of halogenated radicals R are haloalkyl radicals, such as the 3,3,3-trifluoro-n-propyl radical, the 2,2,2,2',2',2'-hexafluoroisopropyl radical, the heptafluoroisopropyl radical and haloaryl radicals, such as the o-, m-, and p-chlorophenyl radical.

Examples of alkyl radicals $R^1$ are the methyl, ethyl, n-propyl, isopropyl, 1-n-butyl, 2-n-butyl, isobutyl and tert-butyl radical. The methyl and ethyl radicals are preferred. Examples of alkyl radicals $R^1$ which are substituted by an ether oxygen atom are the methoxyethyl and ethoxyethyl radical.

Examples of alkyl radicals $R^3$ are the methyl, ethyl, n-propyl, isopropyl, 1-n-butyl, 2-n-butyl, isobutyl, tert-butyl, n-pentyl, isopentyl, neopentyl, tert-pentyl radical, and hexyl radicals, such as the n-hexyl radical. $R^3$ is preferably a hydrogen atom.

Examples of organic compound (1) containing at least two aliphatic double bonds which is used in the process according to the invention are 1,5-hexadiene, 1,7-octadiene, 1,9-decadiene, 1,11-dodecadiene, 1,13-tetradecadiene, 3,5-dimethyl-1,6-heptadiene, 3,5-dimethyl-4-vinyl-1,6-heptadiene, 1,2,4-trivinylcyclohexane, 1,3,5-trivinylcyclohexane, 1,4-divinylbenzene and 1,2,3,4-tetravinylcyclobutane, preference being given to 1,2,4-trivinylcyclohexane and 1,5-hexadiene.

Examples of the radical $R^2$ are therefore those of the formulae: $-(CH_2)_2-$, $-(CH_2)_4-$, $-(CH_2)_6-$, $-(CH_2)_8-$, $-(CH_2)_{10}-$,

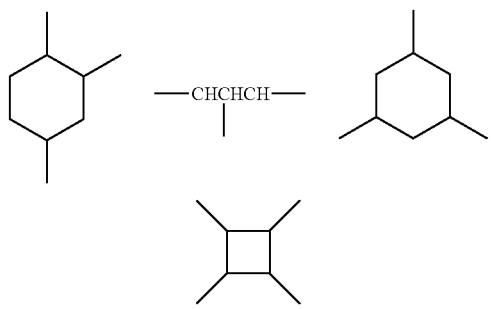

preference being given to the radicals of the formula

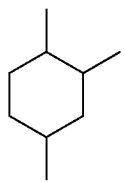

and $-(CH_2)_2-$.

The organopolysiloxanes (2) used in the process according to the invention preferably contain on average at least 1.5 Si-bonded hydrogen atoms, more preferably on average at least two Si-bonded hydrogen atoms per molecule.

With particular preference the organopolysiloxanes (2) used in the process according to the invention contain from two to four Si-bonded hydrogen atoms per molecule.

In the process according to the invention it is possible to use one kind of organopolysiloxane (2) or different kinds of organopolysiloxane (2). As a result of their preparation the organopolysiloxanes (2) are also mixtures; in other words, for example, organopolysiloxanes having two Si-bonded hydrogen atoms per molecule also contain organopolysiloxanes having only one Si-bonded hydrogen atom per molecule.

As organopolysiloxanes (2) it is preferred to use those of the general formula $$R_e H_f SiO_{\frac{4-e-f}{2}}, \quad (VI)$$

where R is as defined above, e is 0 or 1, on average from 0.005 to 1.0, f is 0, 1, 2 or 3, on average from 1.0 to 2.0, and the sum e+f is not greater than 3, in the process according to the invention.

As organopolysiloxanes (2) it is more preferred to use those of the general formula $$H_d R_{3-d} SiO(SiR_2O)_o(SiRHO)_p SiR_{3-d} H_d \quad (VII)$$

where R is as defined above, d is 0 or 1, o is 0 or an integer from 1 to 1000, and p is 0 or an integer from 1 to 6, in the process according to the invention.

The organopolysiloxanes (2) preferably possess a viscosity of from 50 to 20,000 mPa·s at 25° C., more preferably from 500 to 10,000 mPa·s at 25° C.

Preferred examples of organopolysiloxanes of the formula (VII) are copolymers of dimethylhydrosiloxane and dimethylsiloxane units, copolymers of dimethyl-hydrosiloxane, dimethylsiloxane and methylhydrosiloxane units, copolymers of trimethylsiloxane and methyl-hydrosiloxane units, and copolymers of trimethylsiloxane, dimethylsiloxane, and methylhydrosiloxane units.

Processes for preparing organopolysiloxanes having at least two Si-bonded hydrogen atoms per molecule, including those of the preferred kind, are general knowledge.

In the case of the process according to the invention it is preferred to use as organic compound (I) 1,2,4-trivinylcyclohexane and as organopolysiloxane (2) a siloxane of the general formula $$HR_2SiO(SiR_2O)_o SiR_2H$$

where R is as defined above and o is an integer from 50 to 1000.

Organic compound (1) is used in the process according to the invention in amounts such that the ratio employed of aliphatic double bond in organic compound (1) to Si-bonded hydrogen in organopolysiloxane (2) is preferably from 1.1:1 to 20:1, more preferably from 1.5:1 to 10:1, very preferably from 1.5:1 to 5:1, in particular from 1.5:1 to 3.0:1.

As catalysts which promote the addition of Si-bonded hydrogen onto aliphatic multiple bond it is possible in the process of the invention as well to use the same catalysts which it has also been possible to date to use for promoting the addition of Si-bonded hydrogen onto aliphatic multiple bond. The catalysts are preferably a metal from the group of the platinum metals or a compound or a complex from the group of the platinum metals. Examples of such catalysts are metallic and finely divided platinum, which may be on supports, such as silica, alumina or activated carbon, compounds or complexes of platinum, such as platinum halides, e.g., $PtCl_4$, $H_2PtCl_6 \cdot 6H_2O$, $Na_2PtCl_4 \cdot 4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes, such as platinum-1,3-divinyl-1,1,3,3-tetramethyldisiloxane complexes with or without a detectable inorganically bonded halogen content, bis(gamma-picoline)platinum dichloride, trimethylenedipyridineplatinum dicliloride, dicyclopentadieneplatinum dichloride, dimethyl-sulfoxide-ethyleneplatinum(II) dichloride, cyclooctadieneplatinum dichloride, norbornadiene-platinum dichloride, gamma-picolineplatinum dichloride, cyclopentadieneplatinum dichioride, and reaction products of platinum tetrachloride with olefin and primary amine or secondary amine or primary and secondary amine, such as the reaction product of platinum tetrachloride dissolved in 1-octene with sec-butylamine or ammonium-platinum complexes.

The catalyst (3) is used preferably in amounts of from 0.5 to 1000 ppm by weight (parts by weight per million parts by weight), more preferably in amounts of from 2 to 50 ppm by weight, calculated in each case as elemental platinum and based on the overall weight of organic compound (1) and organopolysiloxane (2).

The process according to the invention is preferably conducted at the pressure of the surrounding atmosphere, i.e., approximately at 1020 hPa (abs.), but may also be conducted at higher or lower pressures. Furthermore, the process according to the invention is conducted preferably at a temperature of from 20° C. to 150° C., more preferably from 20° C. to 80° C.

Since the organic compound (1) containing at least two aliphatic double bonds, e.g., 1,2,4-trivinylcyclohexane, tends toward polymerization at relatively high temperatures, it is possible in the process according to the invention to use radical inhibitors, such as 4-methoxyphenol, 2,6-bis(tert-butyl)-4-methylphenol, phenothiazine, hydroquinone or pyrocatechol. The radical inhibitors are used preferably in amounts of from 10 to 500 ppm by weight, based on the overall weight of organic compound (1) and organopolysiloxane (2).

In the process according to the invention it is possible to use inert organic solvents, although the use of inert organic solvents is not preferred. Examples of inert organic solvents are toluene, xylene, octane isomers, butyl acetate, 1,2-dimethoxyethane, tetrahydrofuran, and cyclohexane.

The alkenyl-functional siloxane copolymers prepared according to the process according to the invention prefer- ably have their excess organic compound (1) and also any inert organic solvent used removed by distillation.

Alternatively to organic solvents it is possible to use inert silicone oils in the process according to the invention or to trade the organic solvent for such oils after the preparation of the branched siloxane copolymers of the invention.

For greater ease of handling it is also possible to trade organic solvents for reactive silicone oils after the preparation of the branched siloxane copolymers of the invention, by adding such oils to the reaction mixture and then removing the solvent by distillation. Preference is given to silicone oils having a viscosity of 100 $mm^2/s$ at 25° C. and SiC-bonded alkenyl radicals as reactive constituent.

The alkenyl-functional siloxane copolymers prepared according to the process according to the invention are optionally equilibrated with organopolysiloxane (4).

As organopolysiloxanes (4) it is preferred to use those selected from the group consisting of preferably linear organopolysiloxanes containing terminal triorganosiloxy groups, of the formula $$R_3SiO(SiR_2O)_rSiR_3,$$

where R is as defined above and
r is 0 or an integer whose value is preferably from 1 to 1500, more preferably from 10 to 300,
linear organopolysiloxanes containing terminal hydroxyl groups, of the formula $$HO(SiR_2O)_sH$$

where R is as defined above and
s is an integer whose value is preferably from 1 to 1500, more preferably from 10 to 300,
branched organopolysiloxanes optionally containing hydroxyl groups, comprising units of the formula $$R_3SiO_{1/2}, R_2SiO \text{ and } RSiO_{3/2}$$

where R is as defined above,
cyclic organopolysiloxanes of the formula $$(R_2SiO)_t$$

where R is as defined above and
t is an integer from 3 to 12,
and copolymers comprising units of the formula $$R_2SiO \text{ and } RSiO_{3/2}$$

where R is as defined above.

Preferred organopolysiloxanes (4) are preferably those of the formulae $R_3SiO(SiR_2O)_rSiR_3$, $HO(SiR_2O)_sH$ and $(R_2SiO)_t$, particular preference being given to those of the formula $R_3SiO(SiR_2O)_rSiR_3$.

The proportion of the organopolysiloxanes (4) used in the optional equilibration and alkenyl-functional siloxane copolymers is determined merely by the desired fraction of the alkenyl groups in the siloxane copolymers produced in the course of the optional equilibration, and by the desired average chain length.

In the course of the optional equilibration, it is preferred to use basic or acidic catalysts which promote the equilibration. Examples of basic catalysts are preferably alkali metal hydroxides, such as sodium hydroxide, potassium hydroxide, and cesium hydroxide, trimethylbenzylammonium hydroxide, and tetramethylammonium hydroxide. Alkali metal hydroxides are preferred. Alkali metal hydroxides are used preferably in amounts of from 50 to 10,000 ppm by weight (=parts per million), in particular from 500 to 2000 ppm by weight, based in each case on the overall weight of the alkenyl-functional siloxane copolymers and organopolysiloxanes (4) used.

Examples of acidic catalysts are preferably sulfuric acid, phosphoric acid, trifluoromethanoic acid, phosphorus nitride chlorides, and acidic catalysts which are solid under the reaction conditions, such as acid-activated bleaching earth, acidic zeolites, sulfonated charcoal, and sulfonated styrene-divinylbenzene copolymer. Phosphorus nitride chlorides are preferred. Phosphorus nitride chlorides are used preferably in amounts of from 5 to 1000 ppm by weight (=parts per million), in particular from 50 to 200 ppm by weight, based in each case on the overall weight of the organosilicon compounds used.

The optional equilibration is conducted preferably at from 100° C. to 150° C. and under the pressure of the surrounding atmosphere, i.e., approximately at 1020 hPa (abs.). If desired, however, it is also possible to employ higher or lower pressures. The equilibration is preferably conducted in from 5 to 20% by weight, based on the overall weight of the respective alkenyl-functional siloxane copolymers and organopolysiloxanes (4) used, in water-immiscible solvent, such as toluene. The catalyst can be deactivated before the equilibration mixture is worked up.

The process of the invention can be conducted batchwise, semicontinuously or fully continuously.

As antimisting additives it is preferred to use those alkenyl-functional siloxane copolymers which are prepared without a further equilibration step and have a particularly high level of branching. Preferred additives are obtained from operating in the particularly preferred stoichiometric ranges indicated.

For reducing the formation of aerosol the antimisting additives of the invention are added to the crosslinkable silicone coating compositions.

The antimisting additives of the invention, the alkenyl-functional siloxane copolymers, are used in the crosslinkable silicone coating compositions preferably in amounts of from 0.5 to 10% by weight, more preferably from 1 to 5% by weight, based on the overall weight of the crosslinkable silicone coating compositions.

As crosslinkable silicone coating compositions it is preferred to use those comprising
(A) organosilicon compounds having radicals containing aliphatic carbon-carbon multiple bonds,
(B) organosilicon compounds containing Si-bonded hydrogen atoms,
(C) catalysts which promote the addition of Si-bonded hydrogen onto aliphatic multiple bond,
and if desired
(D) inhibitors.

The invention further provides crosslinkable silicone coating compositions featuring reduced aerosol formation, comprising
(X) antimisting additives of the invention,
(A) organosilicon compounds having radicals containing aliphatic carbon-carbon multiple bonds,
(B) organosilicon compounds containing Si-bonded hydrogen atoms,
(C) catalysts which promote the addition of Si-bonded hydrogen onto aliphatic multiple bond,
and if desired
(D) inhibitors.

For the crosslinkable silicone coating compositions it is possible with preference to use one kind of the antimisting additive (X) of the invention or different kinds of the antimisting additive (X) of the invention.

As organopolysiloxanes (A) having radicals containing aliphatic carbon-carbon multiple bonds it is preferred to use linear or branched organopolysiloxanes comprising units of the general formula

  (VIII)

where $R^5$ is a monovalent, unsubstituted or substituted, hydrocarbon radical having from 1 to 18 carbon atoms per radical, and being free from aliphatic carbon-carbon multiple bonds and
$R^6$ is a monovalent hydrocarbon radical having from 2 to 8 carbon atoms per radical and containing a terminal aliphatic carbon-carbon multiple bond,
z is 0, 1, 2 or 3,
y is 0, 1 or 2
and the sum z+y is 0, 1, 2 or 3,
with the proviso that there are on average at least 1.5 radicals $R^6$, preferably on average at least 2 radicals $R^6$.

Preferred organosilicon compounds (A) are organopolysiloxanes of the general formula

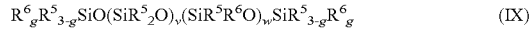  (IX)

where $R^5$ and $R^6$ are as defined above,
g is 0, 1 or 2,
v is 0 or an integer from 1 to 1500, and
w is 0 or an integer from 1 to 200,
with the proviso that on average at least 1.5 radicals $R^6$, preferably on average at least 2 radicals $R^6$, are present.

In the context of this invention formula (IX) is to be understood to mean that v units—$(SiR^5_2O)$— and w units—$(SiR^5R^6O)$— may be distributed arbitrarily in the organopolysiloxane molecule.

As organosilicon compounds (A) it is also possible to use branched polymers containing terminal ω-alkenyl groups, preferably Si-bonded vinyl groups, as described in U.S. Pat. No. 6,034,225 (incorporated by reference), especially column 1 line 43 to column 2 line 13, and U.S. Pat. No. 6,258,913 (incorporated by reference), especially column 1 line 62 to column 2 line 35.

As organosilicon compounds (A) it is also possible to use linear organopolysiloxanes as described in U.S. Pat. No. 6,274,692 (incorporated by reference), especially column 2 lines 3 to 27, which do not have an aliphatically unsaturated hydrocarbon radical, such as an Si-bonded vinyl group, at both ends but instead also have aliphatically saturated hydrocarbon radicals, such as Si-bonded methyl groups, at the ends.

As organosilicon compounds (A) it is also possible to use those as described in DE-A 195 22 144 (incorporated by reference), especially page 2 lines 44 to 67, DE-A 196 29 053 (incorporated by reference), especially page 2 line 51 to page 3 line 29, U.S. Pat. No. 5,760,145 (incorporated by reference), especially column 2 line 46 to column 4 line 23 and U.S. Pat. No. 6,265,497 (incorporated by reference), especially column 2 lines 3 to 47.

The organopolysiloxanes (A) preferably possess an average viscosity of from 100 to 10,000 mPa·s at 25° C.

Examples of hydrocarbon radicals $R^5$ are alkyl radicals, such as the methyl, ethyl, n-propyl, isopropyl, n-butyl, isobutyl, tert-butyl, n-pentyl, isopentyl, neopentyl, tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; cycloalkyl radicals, such as cyclopentyl, cyclohexyl, cycloheptyl radicals and methylcyclohexyl radicals, aryl radicals, such as the phenyl, naphthyl, anthryl and phenanthryl radical; alkaryl radicals, such as o-, m-, p-tolyl radicals, xylyl radicals and ethylphenyl radicals, and aralkyl radicals, such as the benzyl radical, the α- and the β-phenylethyl radical.

Examples of radicals $R^6$ are alkenyl radicals, such as the vinyl, 5-hexenyl, allyl, 3-butenyl and 4-pentenyl radical; and alkynyl radicals, such as the ethynyl, propargyl and 1-propyne radical.

As organosilicon compounds (B) which contain Si-bonded hydrogen atoms it is preferred to use linear, cyclic or branched organopolysiloxanes comprising units of the general formula $$R^5_e H_f SiO_{\frac{4-e-f}{2}}, \qquad (X)$$

where
$R^5$ is as defined above,
e is 0, 1, 2 or 3,
f is 0, 1, 2
and the sum of e+f is 0, 1, 2 or 3,
with the proviso that there are on average at least two Si-bonded hydrogen atoms.

The organosilicon compounds (B) preferably contain at least three Si-bonded hydrogen atoms.

As organosilicon compounds (B) it is more preferred to use organopolysiloxanes of the general formula $$H_h R^5{}_{3-h} SiO(SiR^5{}_2 O)_o (SiR^5 HO)_p SiR^5{}_{3-h} H_h \qquad (XI)$$

where $R^5$ is as defined above,
h is 0, 1 or 2,
o is 0 or an integer from 1 to 1500, and
p is 0 or an integer from 1 to 200,
with the proviso that there are on average at least 2 Si-bonded hydrogen atoms.

In the context of this invention formula (XI) is to be understood to mean that o units—(SiR$^5{}_2$O)— and p units—(SiR$^5$HO)— may be distributed arbitrarily in the organopolysiloxane molecule.

Examples of such organopolysiloxanes are, in particular, copolymers comprising dimethylhydrosiloxane, methylhydrosiloxane, dimethylsiloxane and trimethylsiloxane units, copolymers comprising trimethylsiloxane, dimethylhydrosiloxane and methylhydrosiloxane units, copolymers comprising trimethylsiloxane, dimethylsiloxane and methylhydrosiloxane units, copolymers comprising methylhydrosiloxane and trimethylsiloxane units, copolymers comprising methylhydrosiloxane, diphenylsiloxane and trimethylsiloxane units, copolymers comprising methylhydrosiloxane, dimethylsiloxane and diphenylsiloxane units, copolymers comprising methylhydrosiloxane, phenylmethylsiloxane, trimethylsiloxane and/or dimethylhydrosiloxane units, copolymers comprising methylhydrosiloxane, dimethylsiloxane, diphenylsiloxane, trimethylsiloxane and/or dimethylhydrosiloxane units, and copolymers comprising dimethylhydrosiloxane, trimethylsiloxane, phenylhydrosiloxane, dimethylsiloxane and/or phenylmethylsiloxane units.

As organosilicon compounds (B) it is also possible to use those as described in U.S. Pat. No. 5,691,435 (incorporated by reference), especially column 3 line 45 to column 4 line 29.

The organopolysiloxanes (B) preferably possess an average viscosity of from 10 to 1,000 mPa·s at 25° C.

Organosilicon compound (B) is used preferably in amounts of from 0.5 to 3.5, more preferably from 1.0 to 3.0, gram atoms of Si-bonded hydrogen per mole of Si-bonded radical containing aliphatic carbon-carbon multiple bond in the organosilicon compound (A).

In the case of the crosslinkable silicone coating compositions as well it is possible, as catalysts which promote the addition of Si-bonded hydrogen onto aliphatic multiple bonds, to use the same catalysts which it has also been possible to use to date to promote the addition of Si-bonded hydrogen onto aliphatic multiple bond. As constituent (C) it is preferred to use the abovementioned catalysts (3).

The catalysts (C) are used preferably in amounts of from 10 to 1000 ppm by weight (parts by weight per million parts by weight), more preferably from 50 to 200 ppm by weight, calculated in each case as elemental platinum metal and based on the overall weight of the organosilicon compounds (A) and (B).

The crosslinkable silicone coating compositions may comprise agents which retard the addition of Si-bonded hydrogen onto aliphatic multiple bond at room temperature, known as inhibitors (D).

For the crosslinkable silicone coating compositions as well it is possible as inhibitors (D) to use all inhibitors which it has also been possible to use to date for the same purpose.

Examples of inhibitors (D) are 1,3-divinyl-1,1,3,3-tetramethyldisiloxane, benzotriazole, dialkylformamides, alkylthioureas, methyl ethyl ketoxime, organic compounds or organosilicon compounds having a boiling point of at least 25° C. at 1012 mbar (abs.) and containing at least one aliphatic triple bond, such as 1-ethynylcyclohexan-1-ol, 2-methyl-3-butyn-2-ol, 3-methyl-1-pentyn-3-ol, 2,5-dimethyl-3-hexyne-2,5-diol and 3,5-dimethyl-1-hexyn-3-ol, 3,7-dimethyloct-1-yn-6-en-3-ol, a mixture of diallyl maleate and vinyl acetate, maleic monoesters, and inhibitors such as the compound of the formula HC≡C—C(CH$_3$)(OH)—CH$_2$—CH$_2$—CH=C(CH$_3$)$_2$, available commercially under the trade name "Dehydrolinalool" from BASF.

Where inhibitor (D) is used, it is employed appropriately in amounts of preferably from 0.01 to 10% by weight, more preferably from 0.01 to 3% by weight, based on the overall weight of the organosilicon compounds (A) and (B).

Examples of further constituents which may be used in the crosslinkable silicone coating compositions are agents for adjusting the release force, organic solvents, adhesion promoters, and pigments.

Examples of agents for adjusting the release force of the coatings, repellent to tacky substances, that are produced with the compositions of the invention are silicone resins comprising units of the formula $$R^7 R^5{}_2 SiO_{1/2} \text{ and } SiO_2,$$

known as MQ resins, where $R^7$ is a hydrogen atom, a hydrocarbon radical $R^5$, such as methyl radical, an alkenyl radical $R^6$, such as vinyl radical, and $R^5$ and $R^6$ are as defined above, and the units of the formula $R^7 R^5{}_2 SiO_{1/2}$ may be identical or different. The ratio of units of the formula $R^7 R^5{}_2 SiO_{1/2}$ to units of the formula $SiO_2$ is preferably from 0.6 to 2. The silicone resins are used preferably in amounts of from 5 to 80% by weight, based on the overall weight of the organosilicon compounds (A) and (B).

Examples of organic solvents are petroleum spirits, e.g., mixtures of alkanes having a boiling range of from 70° C. to 180° C., n-heptane, benzene, toluene and xylenes, halogenated alkanes having from 1 to 6 carbon atoms, such as methylene chloride, trichloroethylene and perchloroethylene, ethers, such as di-n-butyl ether, esters, such as ethyl acetate, and ketones, such as methyl ethyl ketone and cyclohexanone.

Where organic solvents are used, they are employed appropriately in amounts of preferably from 10 to 90% by weight, more preferably from 10 to 70% by weight, based on the overall weight of the organosilicon compounds (A) and (B).

Although the sequence when mixing the constituents (X), (A), (B), (C) and, where used, (D) is not critical, it has nevertheless been found appropriate for practical purposes to add constituent (C), viz the catalyst, last to the mixture of the other constituents.

The crosslinking of the compositions of the invention takes place preferably at from 70° C. to 180° C. As energy sources for thermal crosslinking it is preferred to use ovens, e.g., forced air drying ovens, heating tunnels, heated rollers, heated plates, or heat rays from the infrared region.

As well as thermally, the compositions of the invention may also be crosslinked by irradiation with ultraviolet light or by irradiation with UV and IR light. As ultraviolet light it is common to use that having a wavelength of 253.7 nm. In commerce there are a large number of lamps which emit ultraviolet light having a wavelength of from 200 to 400 nm and which preferentially emit ultraviolet light having a wavelength of 253.7 nm.

The invention further provides shaped bodies produced by crosslinking the compositions of the invention.

The shaped bodies preferably comprise coatings, more preferably coatings which repel tacky substances.

The invention further provides a process for producing coatings by applying crosslinkable compositions of the invention to the surfaces that are to be coated and then crosslinking the compositions.

The crosslinkable compositions of the invention are used preferably for producing coatings which repel tacky substances, e.g., for producing release papers. Coatings which repel tacky substances are produced by applying crosslinkable compositions of the invention to the surfaces that are to be made repellent to tacky substances and then crosslinking the compositions.

The application of the compositions of the invention to the surfaces to be coated, preferably surfaces to be made repellent to tacky substances, may be accomplished in any desired manner which is suitable and widely known for the production of coatings from liquid materials; for example, by dipping, brushing, pouring, spraying, rolling, printing, by means of an offset gravure coating apparatus, for example, blade or knife coating, or by means of an airbrush.

The coat thickness on the coated surfaces is preferably from 0.3 to 6 μm, with particular preference from 0.5 to 2.0 μm.

The surfaces to be coated, preferably surfaces to be made repellent to tacky substances, which may be treated in the context of the invention may be surfaces of any materials which are solid at room temperature and 1012 mbar (abs.). Examples of surfaces of this kind are those of paper, wood, cork, and polymer films, e.g., polyethylene films or polypropylene films, woven and nonwoven fabric of natural or synthetic fibers, ceramic articles, glass, including glass fibers, metals, polyethylene-coated paper, and boards, including those of asbestos. The abovementioned polyethylene may in each case be high-pressure, medium-pressure or low-pressure polyethylene. In the case of paper the paper in question may be of a low-grade kind, such as absorbent papers, including kraft paper which is in the raw state, i.e., has not been pretreated with chemicals and/or natural polymeric substances, and which has a weight of from 60 to 150 g/m$^2$, unsized papers, papers of low freeness value, mechanical papers, unglazed or uncalendered papers, papers which are smooth on one side owing to the use of a dry glazing cylinder during their production, without additional complex measures, and which are therefore referred to as "machine-glazed papers", uncoated papers or papers produced from waste paper, i.e., what are known as recycled papers. The paper to be treated in accordance with the invention may also of course, however, comprise high-grade paper types, such as low-absorbency papers, sized papers, papers of high freeness value, chemical papers, calendered or glazed papers, glassine papers, parchmentized papers or precoated papers. The boards as well may be of high or low grade.

The compositions of the invention are suitable, for example, for producing release, backing, and interleaving papers, including interleaving papers which are employed in the production of, for example, cast films or decorative films, or of foam materials, including those of polyurethane. The compositions of the invention are also suitable, for example, for producing release, backing, and interleaving cards, films, and cloths, for treating the reverse sides of self-adhesive tapes or self-adhesive sheets or the written faces of self-adhesive labels. The compositions of the invention are additionally suitable for treating packing material, such as that comprising paper, cardboard boxes, metal foils and drums, e.g., cardboard, plastic, wood or iron, which is intended for storing and/or transporting tacky goods, such as adhesives, sticky foodstuffs, e.g., cakes, honey, candies, and meat; bitumen, asphalt, greased materials, and crude rubber. A further example of the application of the compositions of the invention is the treatment of carriers for transferring pressure-sensitive adhesive films in the context of what is known as the transfer process.

The crosslinkable silicone coating compositions comprising the antimisting additives of the invention are especially suitable for use in rapid coating systems with coating speeds of preferably from 300 to 2000 m/min, more preferably from 400 to 1500 m/min, in which the compositions of the invention are applied at high speeds to the surfaces that are to be coated.

The compositions of the invention are suitable for producing the self-adhesive materials joined to the release paper, both by the offline method and by the inline method.

In the offline method, the silicone composition is applied to the paper and crosslinked, and then, in a subsequent stage, normally after the winding of the release paper onto a roll and after the storage of the roll, an adhesive film, present for example on a label face paper, is applied to the coated paper and the composite is then compressed. In the inline method the silicone composition is applied to the paper and crosslinked, the silicone coating is coated with the adhesive, the label face paper is then applied to the adhesive, and the composite, finally, is compressed.

In the case of the offline method the winding speed is governed by the time needed to render the silicone coating tack-free. In the case of the inline method the process speed is governed by the time needed to render the silicone coating migration-free. With the compositions of the invention the offline method and the inline method can be operated at speeds from 300 to 2000 m/min, preferably from 400 to 1500 m/min.

1. Preparation of the Alkenyl-functional Siloxane Copolymers:

EXAMPLE 1

At 25° C. 683 g of an α,ω-dihydrosiloxane of average chain length $Si_{225}$ and 7.72 g of trivinylcyclohexane are dissolved in 1036 g of toluene (C=C/SiH=1.74) and with thorough stirring a quantity of a 1% strength (based on elemental platinum) solution of a platinum-1,3-divinyl-1,1,3,3-tetramethyldisiloxane complex in an α,ω-divinyldimethylpolysiloxane having a viscosity of 1000 mPa·s at 25° C. (a solution of the catalyst known as the Karstedt catalyst, whose preparation is described in U.S. Pat. No. 3,775,452) is added such that the solution contains 10 ppm platinum. Over the course of 4 h at 30° C. the viscosity becomes very much greater until finally 3900 mm²/s (25° C.) are reached. 2072 g of divinyl-terminated polydimethylsiloxane with 200 mm²/S (25° C.) are added and the toluene is removed in vacuo. The resulting product has a viscosity of 7300 mm²/S (25° C.).

EXAMPLE 2

At 25° C. 683 g of an α,ω-dihydrosiloxane of average chain length $Si_{225}$ and 7.72 g of trivinylcyclohexane are dissolved in 1036 g of toluene (C=C/SiH=1.74) and with thorough stirring an amount of the Karstedt catalyst described in example 1 is added such that the solution contains 10 ppm platinum. Over the course of 4 h at 30° C. the viscosity becomes very much greater until finally 3900 mm²/s (25° C.) are reached. 1036 g of trimethylsilyl-terminated polydimethylsiloxane with 9.8 mm²/s (25° C.) are added and the toluene is removed in vacuo and replaced by the same amount of 1-dodecene. This gives a solution of a vinyl-functional branched siloxane polymer in 1-dodecene, with a viscosity of 4380 mm²/S (25° C.).

EXAMPLE 3

At 25° C. 683 g of an α,ω-dihydrosiloxane of average chain length $Si_{225}$ and 7.72 g of trivinylcyclohexane are dissolved in 1036 g of toluene (C=C/SiH=1.74) and with thorough stirring an amount of the Karstedt catalyst described in example 1 is added such that the solution contains 10 ppm platinum. Over the course of 4 h at 30° C. the viscosity becomes very much greater until finally 3900 mm²/s (25° C.) are reached. 1036 g of trimethylsilyl-terminated polydimethylsiloxane with 9.8 mm²/s (25° C.) are added and the toluene is removed in vacuo. The resulting product has a viscosity of 11,600 mm²/s (25° C.).

EXAMPLE 4

492 g of an α,ω-dihydrosiloxane of average chain length $Si_{50.2}$ are mixed homogeneously with 24.5 g of trivinylcyclohexane (C=C/SiH=1.70) and 516.5 g of toluene and the mixture is activated with 3 mg of platinum, added in the form of the Karstedt catalyst solution described in example 1. The mixture is stirred at 80° C. for 2 h and then 515 g of 1-dodecene are added and the toluene is removed under reduced pressure. This gives a 50% strength solution of a vinyl-functional branched siloxane polymer in 1-dodecene with a viscosity of 275 mm²/s (25° C.).

EXAMPLE 5

492 g of an α,ω-dihydrosiloxane of average chain length $Si_{14.9}$ are mixed homogeneously with 80.5 g of trivinylcyclohexane (C=C/SiH=1.65) and 573 g of a trimethylsilyl-terminated polydimethylsiloxane of viscosity 9.8 mm²/s (25° C.) and the mixture is activated with 3 mg of platinum, added in the form of the Karstedt catalyst solution described in example 1. After heating up independently, the mixture is held at 80° C. for 1 h and then cooled. This gives a 50% strength solution of a vinyl-functional branched siloxane polymer with a viscosity of 660 mm²/s (25° C.).

EXAMPLE 6

592 g of an α,ω-dihydrosiloxane of average chain length $Si_{14.9}$ are mixed with 83 g of trivinylcyclohexane (C=C/SiH=1.70) and the mixture is activated with 3 mg of platinum, added in the form of the Karstedt catalyst solution described in example 1. The reaction mixture attains 110° C. in about 3 minutes and at the same time becomes considerably more viscous. Removal of volatiles gives a clear oil with a viscosity of 9400 mm²/s at 25° C. It contains Si—C-bonded α-olefinic double bonds, which can be hydrosilylated.

2. Use of the Alkenyl-functional Siloxane Copolymers as Antimisting Additives:

EXAMPLE 7

The alkenyl-functional siloxane copolymers of the invention are used, for reducing the formation of aerosol, as additives in crosslinkable silicone coating systems for use in rapid coating processes.

The standard formulation used was a mixture of
- 100 parts by weight of a linear α,ω-divinyl-dimethylpolysiloxane, having a viscosity of 300 mPa·s (25° C.),
- 3.1 parts by weight of a linear polysiloxane comprising hydromethylsiloxane and dimethylsiloxane units in a molar ratio of 2:1 having trimethylsiloxane end units and a viscosity of 34 mPa·s (25° C.),
- 1.25 parts by weight of a 1% strength by weight (based on elemental platinum) solution of a platinum-1,3-divinyl-1,1,3,3-tetramethyldisiloxane complex in an α,ω-divinyldimethylpolysiloxane having a viscosity of 1000 mPa·s at 25° C., and
- 0.3 part by weight of 1-ethynylcyclohexanol.

The additives of the invention from the preparation examples indicated in table 1 were added to the standard formulation in the amounts specified in table 1. As a control, a standard formulation without inventive additive was used. These mixtures were used for coating paper.

The substrate used was paper from Ahlstrom bearing the designation Glassine Larice Tipo 325, 62 g/m². Coating was carried out on the "BMB Pilotplant" coating unit from Bachofen & Meier AG, having a 5-roll applicator unit, at 550 m/min. The application roller was run at 95% of the paper speed. The coating was cured in a drying oven with a length of 18 m at 160° C. This corresponds to a crosslinking time of 1.96 seconds.

The formation of aerosol was determined using the Dusttrak Aerosol Monitor Model 8520. Samples were taken between the silicone application roll and the roll nip at a distance of 12 cm from the silicone application roll.

The blank aerosol value prior to the coating tests was between 0.028–0.031 mg/m$^3$. During the coating tests, the minimum and maximum indicated aerosol levels were recorded and the average was calculated. The average aerosol levels measured during the coating tests were corrected by the blank value of 0.03 mg/m$^3$ in order to determine the effect due purely to the antimisting additives of the invention.

The coating weight was determined by means of x-ray fluorescence analysis in reference to an appropriate standard.

Since the extent of aerosol formation is dependent among other things on the coating weight, the average calculated aerosol levels were standardized to a coating weight of 1 g/m$^2$ for the purpose of better comparability.

The effect of the antimisting additives of the invention on the curing of the coating system was determined immediately by means of a migration test and in parallel by means of extraction of uncrosslinked fractions in MIBK (methyl isobutyl ketone).

The migration is assessed according to its extent using the marks 1 to 6, mark 1 meaning no migration (complete curing), mark 3 slight and mark 6 severe migration (incomplete curing).

The effect of the antimisting additives of the invention on the adhesion of the coating system to the substrate was determined by means of a ruboff test. The abrasion is assessed according to its extent using the marks 1 to 6, mark 1 meaning no abrasion, mark 3 slight and mark 6 severe abrasion.

The test methods are described in the brochure DEHESIVE® Silicones Test Methods from Wacker-Chemie GmbH. The results are summarized in table 1.

mPa·s (25° C.) and an iodine number of 8.0, prepared in accordance with Example 3 of U.S. Pat. No. 6,034,225, 3.6 parts by weight of a linear polysiloxane comprising hydromethylsiloxane and trimethylsiloxane units in a molar ratio of 24:1, 1.04 parts by weight of a 1% strength by weight (based on elemental platinum) solution of a platinum-1,3-divinyl-1,1,3,3-tetramethyldisiloxane complex in an α, ω-divinyldimethylpolysiloxane having a viscosity of 1000 mPa·s at 25° C., and 0.3 part by weight of 1-ethynylcyclohexanol.

The additives of the invention from the preparation examples indicated in table 2 were added to the standard formulation in the amounts specified in table 2. As a control, a standard formulation without inventive additive was used. These mixtures were used for coating paper.

The substrate used was paper from Ahlstrom bearing the designation Glassine Larice Tipo 325, 62 g/m$^2$. Coating was carried out on the pilot coating unit from Dixon with the model number 1060, having a 5-roll applicator unit, at 150 m/min. The application roller was run at 95% of the paper speed. The coating was cured in a drying oven with a length of 3 m at 140° C.

The formation of aerosol was determined using the Dusttrak Aerosol Monitor Model 8520. Samples were taken between the silicone application roll and the roll nip at a distance of 12 cm from the silicone application roll. Additionally, the formation of aerosol was assessed visually and evaluated with the codes 1–3:

1 no visible aerosol formation
2 slightly visible aerosol formation
3 severe aerosol formation.

TABLE 1

| Additive | Amount [%] | Misting [mg/m$^3$] min. | max. | av. | Average misting [mg/m$^3$] standardized to 1.0 g/m$^2$ | Migration | Abrasion | Extract [%] in MIBK |
|---|---|---|---|---|---|---|---|---|
| Ex. 2 | 5 | 0.674 | 1.372 | 0.967 | 0.65 | 1 | 2 | 3.9 |
| Ex. 1 | 8 | 0.504 | 0.989 | 0.687 | 0.42 | 1 | 1 | 5.3 |
| — | — | 19.47 | 30.17 | 24.27 | 16.51 | 1 | 2 | 3.9 |

The examples in comparison with the control test without additive show that the addition of the antimisting additives of the invention significantly reduces the formation of aerosol by crosslinkable silicone coating systems in rapid coating processes.

Deleterious effects on migration and substrate adhesion (abrasion) are not observed; within the bounds of measurement accuracy, the proportion of the extractable fractions is not increased.

EXAMPLE 8

At a high application weight and with certain coating formulations, aerosol may be formed even at machine speeds well below 500 m/min. The alkenyl-functional siloxane copolymers of the invention were used, for reducing the formation of aerosol, as additives in crosslinkable silicone coating systems for use in such coating processes.

The standard formulation used was a mixture of 100 parts by weight of a branched polysiloxane containing vinyldimethylsiloxy end groups, having a viscosity of 420

During the coating experiments, the maximum indicated aerosol levels were recorded. The coating weight was determined by means of X-ray fluorescence analysis in reference to an appropriate standard, and was 4 g/m$^2$.

Furthermore, the effect of the antimisting additives according to the invention on the curing of the coating system was determined by means of a migration test. The migration test is described in the brochure DEHESIVE® Silicones Test Methods from Wacker-Chemie GmbH.

The results are summarized in table 2.

TABLE 2

| Additive | Amount of additive in % | Misting, mg/m$^3$ (Dusttrak) | Misting (visual) | Migration |
|---|---|---|---|---|
| Example 6 | 2 | 3.5 | 1 | 1.5 |
| Example 5 | 4 | 4 | 1 | 1 |
| Example 4 | 4 | 7.5 | 1.5 | 1.5 |
| Example 3 | 5 | 3 | 1 | 1.5 |

TABLE 2-continued

| Additive | Amount of additive in % | Misting, mg/m³ (Dusttrak) | Misting (visual) | Migration |
|---|---|---|---|---|
| Example 2 | 4 | 3.5 | 1.5 | 2 |
| Example 1 | 8 | 2.5 | 1.5 | 1.5 |
| — | — | 17 | 3 | 2 |

The comparative experiments show that the addition of the branched organosilicon compound of the invention, as antimisting additives markedly reduces the formation of aerosol by crosslinkable silicone coating systems in rapid coating processes.

Example 9 and comparative test as per EP-A 716 115:

An important criterion for the simple usefulness of antimisting additives in curable compositions is their miscibility with these compositions.

In order to obtain reproducible results when curing on the coating machine, it is advantageous if the additive can be dispersed homogeneously in the desired amount in the curable composition without unduly great effort, and forms a clear formulation. Accordingly, 104.4 g of the standard formulation from Example 7 are mixed with 10 g of each of the additives from preparation examples 1 to 6 by moderate stirring using a glass rod, so that a ready-to-use formulation is formed within a few minutes. All formulations are homogeneous, clear, and free from streaks.

For comparison, in accordance with the state of the art, an antimisting additive as per EP-A 716 115 is prepared:

A mixture of 34 g of 2-methyl-3-buten-2-ol and 190 g of an allyl polyether of the formula $CH_2=CH—CH_2O(C_2H_4O)_{9.4}H$ is mixed with 200 g of a siloxane having trimethylsiloxy end groups and comprising hydromethylsiloxane and dimethylsiloxane units (0.30% by weight active hydrogen, viscosity 37 mm²/s at 25° C.), and the mixture is heated to 50° C. and activated with 20 ppm platinum in the form of the platinum catalyst described in Example 8 (Karstedt catalyst). After 2 hours, the exothermic reaction gives a clear product with an active hydrogen content of less than 0.002% by weight and a slight brown coloration. Stirring 10 g of this product into 104.4 g of the standard formulation from Example 7 gives a milky mixture which shows severe phase separation after 4 hours of storage. Even when only 5 g of this additive is mixed in under strong shearing with a Turrax® device, a clear formulation is not obtained.

The invention claimed is:

1. In a process for the coating of substrates with crosslinkable silicone(s) wherein an antimisting additive is employed for reducing the formation of aerosol, the improvement comprising adding to said crosslinkable silicone(s) at least one antimisting additive which is an alkenyl-functional siloxane copolymer comprising (a) siloxane units of the formula $$R_a Si(OR^1)_b O_{\frac{4-(a+b)}{2}} \quad (I)$$

where each R independently is an identical or different, optionally halogenated hydrocarbon radical having from 1 to 18 carbon atoms per radical, $R^1$ each is an identical or different alkyl radical having from 1 to 4 carbon atoms per radical, optionally substituted by an ether oxygen atom, a is 0, 1, 2 or 3, b is 0, 1, 2 or 3 and the sum a+b is not greater than 3, (b) per molecule at least one siloxane unit of the formula $$ASiR_c SiO_{\frac{4-(c+1)}{2}} \quad (II)$$

where c is 0, 1 or 2,

A is a radical of the formula $$—CH_2CHR^3—R^2(CR^3=CH_2)_{x-1}$$

where $R^2$ is a divalent, trivalent or tetravalent hydrocarbon radical having from 1 to 25 carbon atoms per radical, $R^3$ is a hydrogen atom or an alkyl radical having from 1 to 6 carbon atoms per radical, and x is 2, 3 or 4, and (c) per molecule on average at least one unit selected from the group consisting of units of the formulae $$O_{\frac{4-(c+1)}{2}}R_c Si—A^1—SiR_c O_{\frac{4-(c+1)}{2}}, \quad (III)$$

$$O_{\frac{4-(c+1)}{2}}R_c Si—A^2—SiR_c O_{\frac{4-(c+1)}{2}}, \quad (IV)$$
$$\phantom{O_{\frac{4-(c+1)}{2}}R_c Si—A^2—}\underset{|}{SiR_c O_{\frac{4-(c+1)}{2}}}$$

$$\phantom{O_{\frac{4-(c+1)}{2}}R_c Si—A^3—}\overset{SiR_c O_{\frac{4-(c+1)}{2}}}{\underset{|}{\phantom{X}}} \quad (V)$$
$$O_{\frac{4-(c+1)}{2}}R_c Si—A^3—SiR_c O_{\frac{4-(c+1)}{2}},$$
$$\phantom{O_{\frac{4-(c+1)}{2}}R_c Si—A^3—}\underset{|}{SiR_c O_{\frac{4-(c+1)}{2}}}$$

where $A^1$ is a radical of the formula $$—CH_2CHR^3—\underset{|}{R^2}—CHR^3CH_2—$$
$$\phantom{—CH_2CHR^3—}\overset{(CR^3=CH_2)_{x-2}}{\phantom{X}}$$

where $A^2$ is a radical of the formula $$—CH_2CHR^3—\underset{|}{\overset{(CR^3=CH_2)_{x-3}}{R^2}}—CHR^3CH_2—$$
$$\phantom{—CH_2CHR^3—}\underset{|}{CHR^3CH_2—}$$

$(x-3 \geq 0)$ with the proviso that $R^2$ is not a divalent hydrocarbon radical, and $A^3$ is a radical of the formula

with the proviso that $R^2$ is not a divalent or trivalent hydrocarbon radical.

2. The process of claim 1, wherein the alkenyl-functional siloxane copolymer comprises
   (a) siloxane units of the formula $$R_2SiO \qquad (I'),$$

(b) per molecule on average more than one siloxane unit of the formula $$AR_2SiO_{1/2} \qquad (II') \text{ and}$$

(c) per molecule on average at least one unit selected from the group consisting of units of the formulae

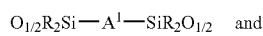
   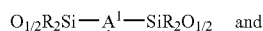

3. The process of claim 1, wherein the radical $R^3$ is a hydrogen atom.

4. In a process for the coating of substrates with crosslinkable silicone(s) wherein an antimisting additive is employed for reducing the formation of aerosol, the improvement comprising adding to said crosslinkable silicone(s) at least one antimisting additive which is an alkenyl-functional siloxane copolymer prepared by
   reacting at least one organic compound (1) containing at least two aliphatic double bonds, of the formula $$R^2(CR^3{=}CH_2)_x,$$

where each $R^2$ is independently a divalent, trivalent or tetravalent hydrocarbon radical having from 1 to 25 carbon atoms per radical,
   $R^3$ each independently is a hydrogen atom or an alkyl radical having from 1 to 6 carbon atoms per radical, and
   x is 2, 3 or 4,
   with at least one organopolysiloxane (2) having on average more than one Si-bonded hydrogen atom per molecule,
   in the presence of a hydrosilylation catalyst (3),
   the ratio of aliphatic double bonds in organic compound (1) to Si-bonded hydrogens in the organopolysiloxane (2) being such that alkenyl-functional siloxane copolymers comprising on average more than one alkenyl group per molecule, of the formula $$-CR^3{=}CH_2,$$

are obtained.

5. The process of claim 4, wherein said organic compound (1) comprises 1,2,4-trivinylcyclohexane.

6. The process of claim 4, wherein at least one organopolysiloxane (2) has the formula $$HR_2SiO(SiR_2O)_oSiR_2H$$

where each R independently is an identical or different or different, optionally halogenated $C_{1-18}$ hydrocarbon radical, and o is an integer from 50 to 1000.

7. The process of claim 4, wherein the ratio of aliphatic double bonds in organic compound (1) to Si-bonded hydrogens in organopolysiloxane (2) is from 1.5:1 to 3.0:1.

8. The process of claim 1, wherein said crosslinkable silicone coating composition comprises
   (A) at least one organosilicon compound bearing radicals containing one or more aliphatic carbon-carbon multiple bonds, said organosilicon compound different from said antimisting additive,
   (B) at least one organosilicon compound containing Si-bonded hydrogen atoms,
   (C) at least one hydrosilylation catalyst, and optionally,
   (D) one or more inhibitors.

9. The process of claim 4, wherein said crosslinkable silicone coating composition comprises
   (A) at least one organosilicon compound bearing radicals containing one or more aliphatic carbon-carbon multiple bonds, said organosilicon compound different from said antimisting additive,
   (B) at least one organosilicon compound containing Si-bonded hydrogen atoms,
   (C) at least one hydrosilylation catalyst, and optionally,
   (D) one or more inhibitors.

10. A crosslinkable silicone coating composition with reduced aerosol formation, comprising
    (X) at least one antimisting additive as defined in claim 1,
    (A) at least one organosilicon compound having radicals containing one or more aliphatic carbon-carbon multiple bonds, said organosilicon compound different from (X),
    (B) at least one organosilicon compound containing Si-bonded hydrogen atoms,
    (C) at least one hydrosilylation catalyst, and optionally,
    (D) one or more inhibitors.

11. A crosslinkable silicone coating composition with reduced aerosol formation, comprising
    (X) at least one antimisting additive as defined in claim 4,
    (A) at least one organosilicon compound having radicals containing one or more aliphatic carbon-carbon multiple bonds, said organosilicon compound different from (X),
    (B) at least one organosilicon compound containing Si-bonded hydrogen atoms,
    (C) at least one hydrosilylation catalyst, and optionally,
    (D) one or more inhibitors.

12. A shaped body produced by crosslinking the composition of claim 10.

13. The shaped body of claim 12, which is a coating.

14. The shaped body of claim 12, which is a release coating for tacky substances.

15. A process for producing coatings with reduced aerosol formation during the coating process, comprising applying the crosslinkable composition of claim 10 to a surface to be coated, and crosslinking the crosslinkable composition.

16. A process for producing a release coating for tacky substances, comprising applying a crosslinkable composition of claim 10 to a surface desired to have release properties for tacky substances, and crosslinking the composition.

* * * * *